US005519766A

United States Patent [19]
Jones

[11] Patent Number: 5,519,766
[45] Date of Patent: May 21, 1996

[54] MESSAGE LENGTH REPORTING SYSTEM FOR TELEPHONE COMMUNICATION SYSTEM

[75] Inventor: Scott A. Jones, Prides Crossing, Mass.

[73] Assignee: Boston Technology, Inc., Wakefield, Mass.

[21] Appl. No.: 946,894

[22] Filed: Sep. 18, 1992

[51] Int. Cl.$^6$ .............................. H04M 3/50; H04M 1/64
[52] U.S. Cl. .................. 379/74; 379/67; 379/88; 379/89
[58] Field of Search .......................... 379/67, 74, 76, 379/77, 88, 89, 79

[56] References Cited

U.S. PATENT DOCUMENTS

| | | | |
|---|---|---|---|
| 3,931,470 | 1/1976 | Zimmermann | 379/77 X |
| 4,371,752 | 2/1983 | Matthews et al. | 379/89 |
| 4,514,593 | 4/1985 | Hattori et al. | 379/74 |
| 4,580,012 | 4/1986 | Matthews et al. | 379/89 |
| 4,581,486 | 4/1986 | Matthews et al. | 379/88 |
| 4,585,906 | 4/1986 | Matthews et al. | 379/88 |
| 4,602,129 | 7/1986 | Matthews et al. | 379/88 |
| 4,646,346 | 2/1987 | Emerson et al. | 379/89 X |
| 4,713,835 | 12/1987 | Bond et al. | 379/79 |
| 4,891,835 | 1/1990 | Leung et al. | 379/88 |
| 5,003,575 | 3/1991 | Chamberlin et al. | 379/74 X |
| 5,274,696 | 12/1993 | Perelman | 379/89 |
| 5,305,376 | 4/1994 | Ukegawa | 379/88 X |
| 5,323,148 | 6/1994 | Olazabal et al. | 379/67 |

FOREIGN PATENT DOCUMENTS 1-296749   11/1989   Japan ................................ 379/88
2194667    3/1988   United Kingdom .
A8707801   12/1987   WIPO .

OTHER PUBLICATIONS

Patent Abstracts of Japan, vol. 17, No. 317 (E–1382), Jun. 16, 1993 for Japanese Application No. 5–030198 (Matsushita Electric), Feb. 1993.
H. Schranz et al., "The Small Workgroup System for Voice Messaging and Remote Dictation", *Philips Telecommunication Review*, vol. 47, No. 1, Mar. 1989, pp. 15–22.
Patent Abstracts of Japan, vol. 14, No. 471 (E–990), Oct. 15, 1990 for Japanese Application No. 2–193433 (NEC Corp), Jul. 31, 1990.
Patent Abstracts of Japan, vol. 10, No. 42 (E–382), Feb. 19, 1986 for Japanese Application No. 6–0197047 (Mitsubishi Denki KK), Oct. 5, 1985.
S. Rangnekar et al., "AT&T Voice Mail Service", *AT & T Technology*, vol. 5, No. 4, 1990, New Jersey, pp. 26–29.
European Search Report for corresponding European Patent Application No. 93307183.9, mailed Aug. 5, 1994.

*Primary Examiner*—Jeffery Hofsass
*Assistant Examiner*—Daniel S. Hunter
*Attorney, Agent, or Firm*—Staas & Halsey

[57] ABSTRACT

A voice mail message system detects the length of each message and provides an indication of the length to a user together with other message information when messages are requested. The indication of message length may be a qualitative one in which the number of short, medium and long messages is indicated to the user. In addition, if a user interrupts a message as it is being played back, the user is informed of the remaining length of the message.

11 Claims, 3 Drawing Sheets

MESSAGE LENGTH REPORTING SYSTEM FOR TELEPHONE COMMUNICATION SYSTEM

BACKGROUND OF THE INVENTION

1. Field of the Invention

The present invention relates to a telephone communication system providing at least voice mail message service and, more particularly, to a voice mail system providing information on the length of messages for a user.

2. Description of the Related Art

There are a number of telephone communication systems available offering information services to users. Many of these systems store and forward voice mail messages. Examples of such systems are disclosed in U.S. Pat. Nos. 4,371,752; 4,580,012; 4,581,486; 4,585,906; and 4,602,129, all assigned to VMX, Inc. (U.S. Pat. No. 4,371,752 was originally assigned to ECS Telecommunications, Inc.). Other systems are described in U.S. Pat. Nos. 5,029,199 and 5,193,110 which are assigned to Boston Technology, Inc. and are incorporated herein by reference. These systems are connected to a central office of a local telephone company or to a private branch exchange or other system handling calls for a large number of telephones. When one of the telephones serviced by the central office or other system is not answered, the calling party is given an opportunity to leave a telephone message which is stored for later reproduction by the user of the called telephone. These systems are capable of storing messages of considerable length, an hour or more, but a typical message is much shorter.

When a user requests information about messages stored by a voice mail message system, the number of calls is typically reported and the user is given access to the calls to reproduce, delete, continue to store, forward to another user, etc. However, no information is provided to the user regarding the length of the messages and thus the user has little choice but to listen to at least part of all of the messages and try to guess how much longer each message will last.

SUMMARY OF THE INVENTION

An object of the present invention is to provide information on the length of voice mail messages.

Another object of the present invention is to provide qualitative information on voice mail messages together with other message information when a user requests access to stored messages.

A further object of the present invention is to aurally provide the remaining length of a voice mail message when playback of a voice mail message is interrupted.

The above objects are attained by providing a method of operating a telephonic message system, comprising the steps of storing a voice message from an originating telephone; storing a message length of the voice message; reproducing the voice message for a receiving device; and generating length signals, indicative of the message length, for delivery to the receiving device. Preferably, the length signals are audio signals including qualitative information such as short, medium or long, when a user requests access to his or her stored messages. Subsequently, when a message is being played back, a user has the ability to interrupt the message at which time the remaining length of the message is reported to the user via his or her telephone or other telephonic device.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
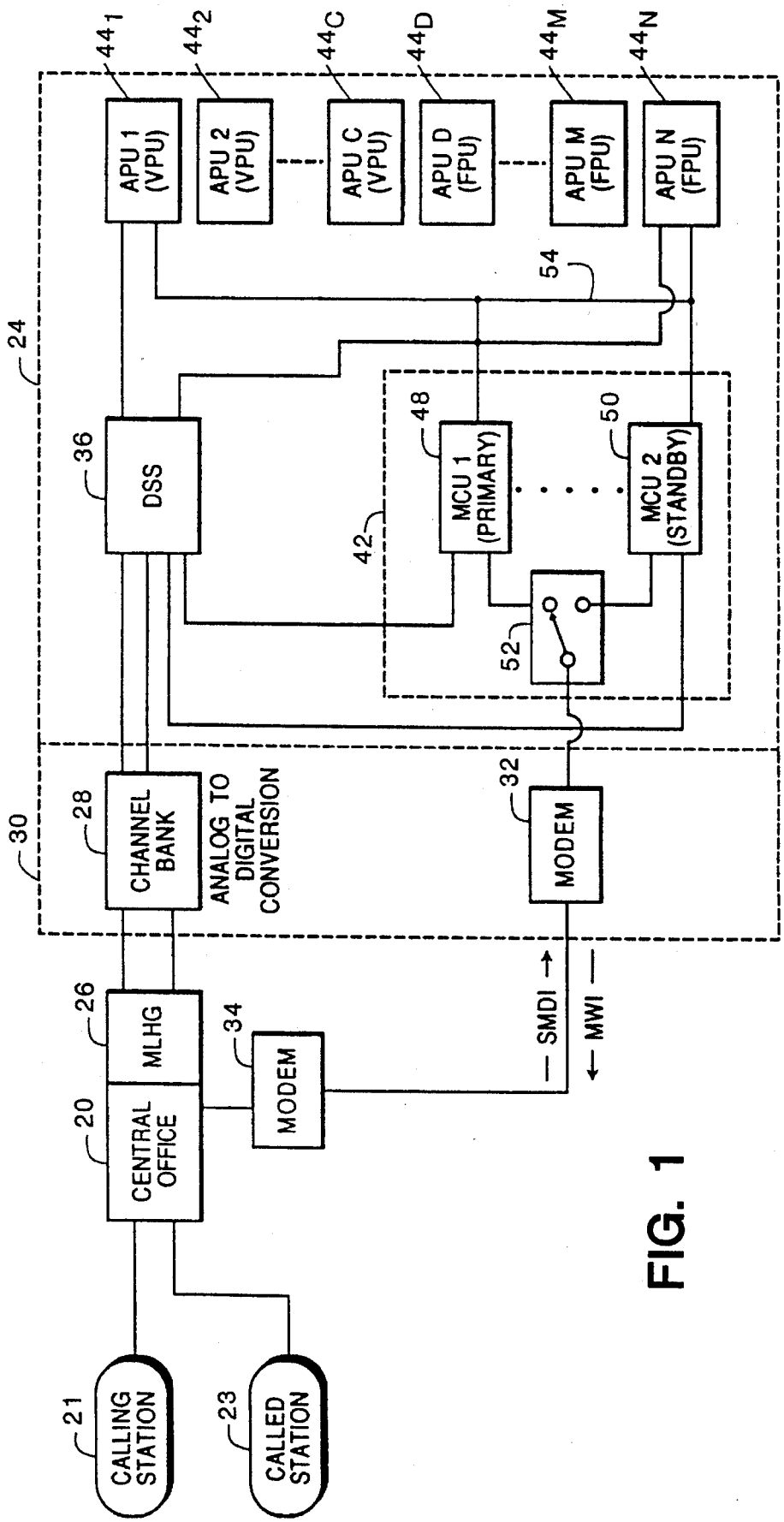
FIG. 1 is a block diagram of a local telephone system including an information services system providing voice mail messaging.

As illustrated in FIG. 1, a local telephone system includes a central office 20 connected to a plurality of telephones including at least one calling station 21 and one called station 23. The central office 20 is connected to an integrated services platform 24, preferably via multi-line hunt groups 26. If the central office 20 communicates using analog signals, an optional channel bank 28 provides analog to digital conversion for the integrated services platform 24. The channel bank 28 is included in an optional telephone network interface 30 which may also include a modem 32 for transmitting message packets between the integrated services platform 24 and central office 20 via another modem 34.

The integrated services platform 24 includes a digital switching system 36 which is controlled by a master control unit (MCU) 42. The digital switching system 36 routes data between the central office 20 and application processing units (APUs) 44. The application processing units 44 may be dedicated to different tasks, including voice processing in VPUs and facsimile processing in FPUs.

The master control unit 42 preferably includes at least a primary MCU 48 and a standby MCU 50. A switch 52 routes the messages from the central office 20 to the active MCU. Each MCU 48, 50 is also connected to each of the APUs 44 via a channel bus 54.

Figure 2:
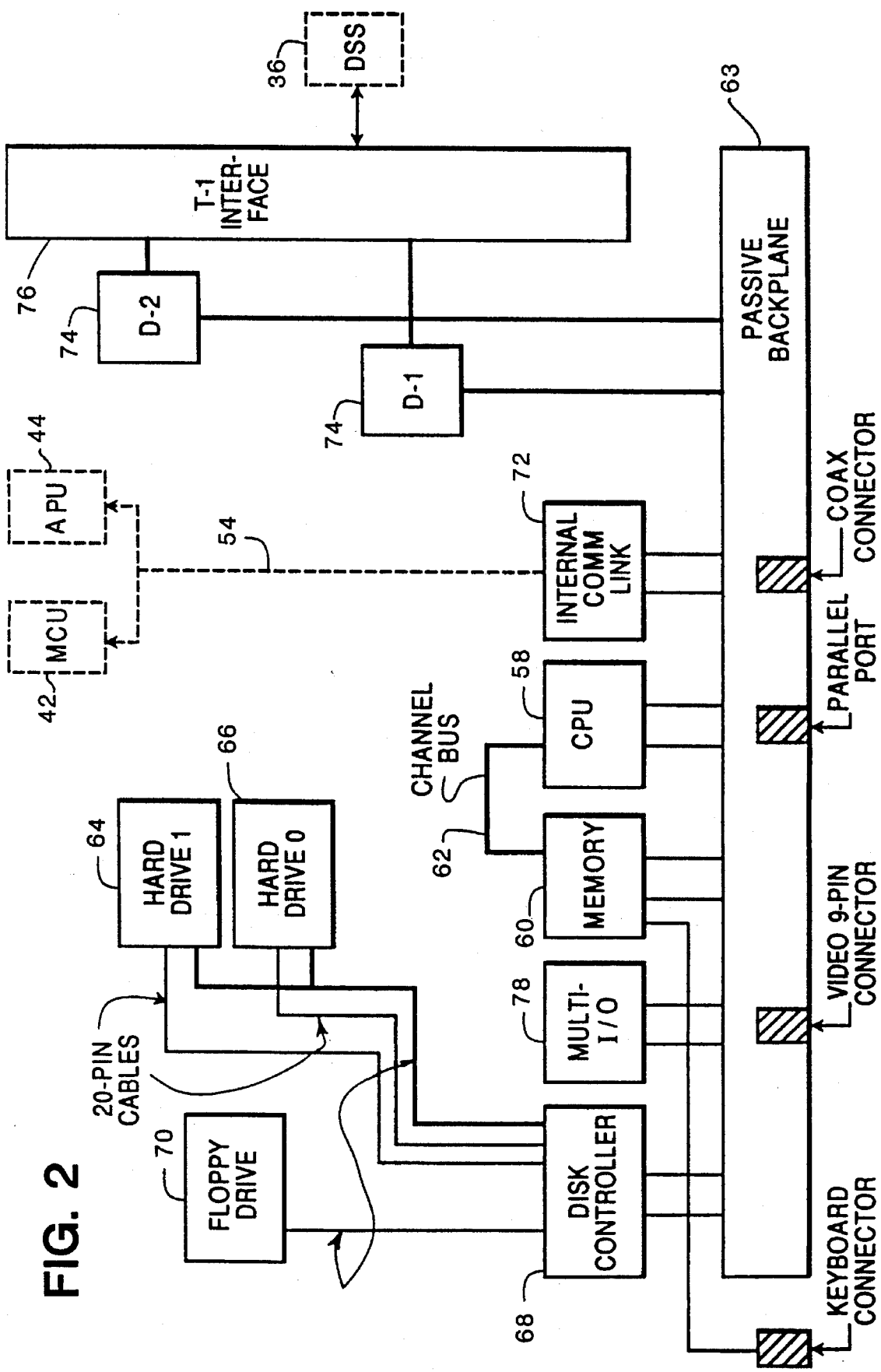
FIG. 2 is a block diagram of an application processing unit in the information services system of FIG. 1 performing voice mail message functions.

An example of an application processing unit 44 is illustrated in FIG. 2. A CPU 58, such as an INTEL 80386, is connected to a memory 60 via a conventional 32-bit bus 62. Connections to other devices within an APU 44 are provided by a passive backplane 63. These devices include hard drives 64, 66 connected to a disk controller 68 which also controls a floppy drive 70. An internal communication link 72, such as an ETHERNET communication link, connects the APU 44 to other processors in the platform 24, such as the MCU 42 and another APU 44. All of these components may be conventional, as disclosed in U.S. patent application Ser. No. 07/594,648. Digital ports 74 connect the passive backplane 63 to the digital switching system 36 via a telephone communication standard T-1 interface 76. Other input and output may be provided by multi-I/O unit 78.

Figure 3:
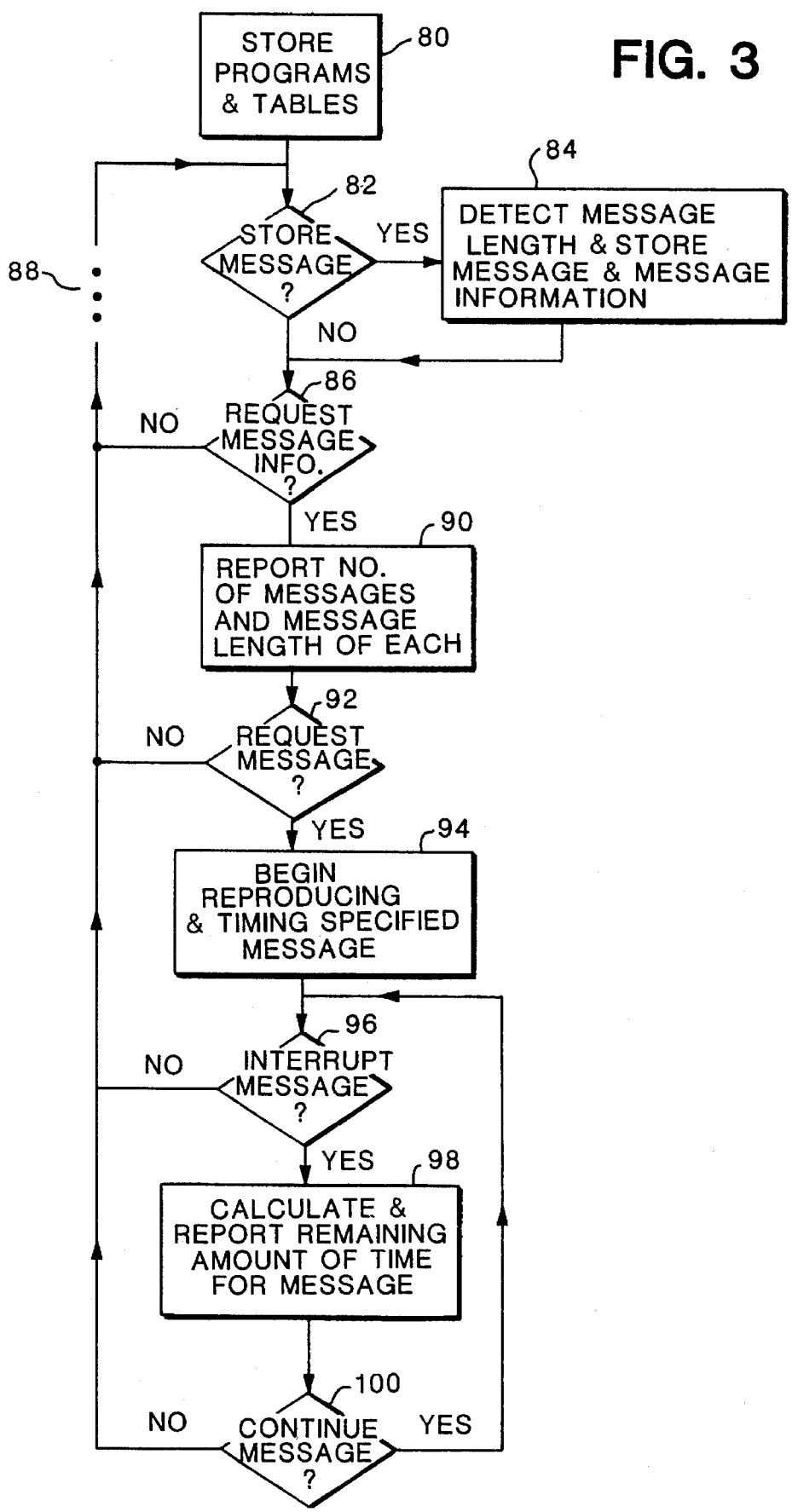
FIG. 3 is a flow chart of a method according to the present invention.

The systems illustrated in FIGS. 1 and 2 are operated for the most part in a conventional manner. During installation and periodically thereafter to update the software, programs and tables are stored 80 in the MCU 42 and APU 44, as indicated in FIG. 3. When a user of a telephone at calling station 21 calls a user at called station 23 which is serviced by the platform 24, any of the following may occur. The call may be completed by the user answering at the called station 23 in which case the platform 24 may not take any action. Also, the user at the calling station 21 could hang up or some other event could occur to interrupt the calling sequence prior to any action by the platform 24. If the called station 23 does not answer the call or the platform has been instructed to hold all calls, the user at the calling station 21 is given the opportunity to leave a message.

If the user at calling station 21 chooses to store 82 a message, the calling station 21 is connected to one of the APUs 44 by the digital switching system 36 under the control of the master control unit 42. The program stored in the APUs 44 according to the present invention will detect the length of the message as it is being stored 84. Additional message information, such as the caller's name, time and date that the message was received, etc., may also be stored with the message length as corresponding to the voice message. This information may be stored on one of the hard drives 64, 66 in the assigned APU 44. The above-described procedure may be performed simultaneously for different callers by one or several APUs 44 and may continue while messages are delivered to users.

When a user at a previously called station 23 accesses the platform 24, the user is given the opportunity to request 86 message information on the messages stored by the platform 24. If the user does not wish to request message information, other services provided by the platform 24 may be used as indicated by the ellipses 88 in FIG. 3. Assuming the user wishes to obtain information on messages which were addressed to his telephone or other telephonic device, at least the number of messages and an approximate indication of the length of each message is preferably provided 90. As disclosed in U.S. Pat. No. 5,029,199, this information is preferably stored in the user's message list mailbox file which is identified by the user's mailbox number. The called station 23 of the user is usually used as the mailbox number which thus may be considered a receiving device identifier. In addition, the user may be provided with the total time required to play back all of the stored messages.

For example, upon requesting message information, the user may hear a message, such as "you have four messages comprising forty-two minutes of which three are new comprising five minutes." Alternatively, the user may hear a message, such as "you have one long message, three medium messages and ten short messages." The determination of what is long, medium and short is preferably made using a conversion table which was previously stored 80. The conversion table will convert the quantitative value detected when the message was stored 84 to a qualitative indication of temporal length, i.e., short, medium or long, etc. The conversion table may be established by the vendor of the platform 24, a platform manager at the local telephone company, or could even be customized by individual users. In any case, the qualitative indications of temporal length are not limited to short, medium or long, but may be any indication even something as precise as "between one and two minutes." Alternatively, more detailed information may be provided, even to the extent of providing the message length in, e.g., seconds, for each message.

After the message information is reported 90, the user is given an opportunity to request 92 that a message be played. When such a request is received, playback of the message is begun 94, preferably after aurally indicating the length of the message, with something like "your fifth message, thirty-three seconds in length is . . . " Alternatively, the indication of the length of the specified message may be qualitative, i.e., short, medium or long. After the introductory information, a timer is preferably started, so that if the specified message is interrupted 96, the APU 44 may report 98 to the user the remaining percentage of the message or the amount of time required to complete playback of the voice mail message. The remaining amount of time can be easily calculated by subtracting from the message length stored with the message, a played portion length obtained from the timer. The user, upon hearing the remaining amount of time, is given the option of continuing 100 playback of the message, or else requesting playback of a different message, forwarding the partially played back message to another person, etc.

The many features and advantages of the present invention are apparent from the detailed specification, and thus it is intended by the appended claims to cover all such features and advantages of the system which fall within the true spirit and scope of the invention. Further, numerous modifications and changes will readily occur to those skilled in the art from the disclosure of this invention; for example if the user has a telephone with a display, the remaining message length may be displayed instead of or in addition to an audible report. It is not desired to limit the invention to the exact construction and operation illustrated and described; accordingly, suitable modifications and equivalents may be resorted to, as falling within the scope and spirit of the invention.

What is claimed is:

1. A method of operating a telephonic message system, comprising the steps of:

(a) storing a voice message from an originating telephone;

(b) detecting and storing a message length of the voice message stored in step (a);

(c) storing a conversion table for converting from a quantitative value to a qualitative indication of temporal length;

(d) providing information on the voice message stored in step (a) to a receiving device;

(e) determining audio signals to be generated to provide a qualitative indication of message length, using the message length stored in step (b) and the conversion table stored in step (c);

(f) generating audio signals providing qualitative information indicating the message length stored in step (b), for delivery to the receiving device;

(g) playing back the voice message stored in step (a) for a receiving device, after said generating in step (c) and said providing in step (d).

2. A method of operating a telephonic message system, comprising the steps of:

(a) storing a voice message from an originating telephone;

(b) storing a message length of the voice message stored in step (a);

(c) playing back the voice message stored in step (a) for a receiving device; and (d) generating audio signals providing qualitative information indicating the message length stored in step (b), for delivery to the receiving device, said generating in step (d) comprising the substeps of:

(d1) interrupting said playing in step (c) in response to an interrupt signal from the receiving device; and (d2) generating the audio signals to qualitatively indicate a remaining amount of time to complete said playing of the voice message stored in step (a).

3. A method as recited in claim 2, further comprising the step of (e) timing said playing in step (c) to determine a played back portion length of the voice message from beginning to said interrupting in step (d1), and wherein said generating in step (d) further comprises the step of (d3) calculating the remaining amount of time by subtracting the played back portion length from the message length.

4. A method as recited in claim 3, wherein said generating in step (d2) comprises the step of transmitting audio signals indicating the remaining amount of time to the receiving device.

5. A method for operating a telephonic message system for messages from originating devices to receiving devices, comprising the steps of:

(a) storing digital representations of messages formed of analog information transmitted from the originating devices;

(b) detecting a message length for each of the messages stored as digital representations in step (a);

(c) storing message information associated with each of the messages, the message information including the message length and an identifier of one of the receiving devices;

(d) reproducing the messages stored as digital representations;

(e) accepting, from the receiving devices, informational requests about the messages addressed thereto, including interruption requests that interrupt delivery of the messages and non-interruption requests produced when none of the messages is being reproduced;

(f) aurally reporting, in response to the non-interruption requests from one of the receiving devices, a number of messages addressed thereto, together with an indication of the message length of the messages; and (g) aurally reporting, in response to each interruption request, a remaining time of an interrupted message.

6. A method as recited in claim 5, wherein said providing in step (e) includes indicating the total length of the messages addressed to the one of the receiving devices.

7. A method as recited in claim 5, wherein said providing in step (e) includes aurally indicating the length of each message addressed to the one of the receiving devices.

8. A method as recited in claim 5, further comprising the steps of:

(f) playing a specified message in response to a playback request from the one of the receiving devices;

(g) interrupting said playing in response to one of the interruption requests from the one of the receiving devices; and (h) aurally indicating a remaining amount of time of the specified message after said interrupting in step (g).

9. A method as recited in claim 8, wherein said indicating in step (h) comprises aurally reporting a percentage of the specified message remaining.

10. A method as recited in claim 8, further comprising the step of (i) aurally identifying the specified message and reporting the length of the specified message after receiving the playback request, but prior to said playing of the specified message in step (f).

11. A telephonic message system for messages from originating telephones to receiving devices, comprising:

first storage means for storing digital representations of messages formed of analog information transmitted from the originating telephones;

detection means for detecting a message length for each of the messages stored as digital representations in said first storage means;

second storage means for storing message information associated with each of the messages, the message information including the message length and an identifier of one of the receiving devices;

input means for accepting, from the receiving devices, informational requests about the messages addressed thereto, including interruption requests that interrupt delivery of the messages and non-interruption requests produced when none of the messages is being reproduced; and output means for reproducing the messages stored as digital representations, for providing, in response to each of the non-interruption requests from one of the receiving devices, a number of messages addressed thereto, together with an indication of the message length of each message and for aurally reporting, in response to each interruption request, a remaining time of an interrupted message.

* * * * *